United States Patent [19]

Ridgway, Jr.

[11] 3,843,807

[45] Oct. 22, 1974

[54] TEXTURIZING PROCESS FOR SINGLE-CELL PROTEIN

[75] Inventor: John A. Ridgway, Jr., La Porte, Ind.

[73] Assignee: Standard Oil Company, Chicago, Ill.

[22] Filed: Aug. 21, 1972

[21] Appl. No.: 282,469

Related U.S. Application Data

[63] Continuation-in-part of Ser. No. 47,896, June 19, 1970, abandoned.

[52] U.S. Cl.................. 426/137, 426/148, 426/456
[51] Int. Cl. ............................................. A23j 3/00
[58] Field of Search ............ 99/14, 17; 195/3 H, 4, 195/28–29; 426/137, 148, 456

[56] References Cited
UNITED STATES PATENTS

| | | |
|---|---|---|
| 3,480,442 | 11/1969 | Atkinson .............................. 99/17 |
| 3,488,770 | 1/1970 | Atkinson .............................. 99/17 |
| 3,662,671 | 5/1972 | Frederiksen et al. ............... 99/14 X |
| 3,662,672 | 5/1972 | Hoer .................................. 99/14 X |

*Primary Examiner*—James R. Hoffman
*Attorney, Agent, or Firm*—Werten F. W. Bellamy; Arthur G. Gilkes; william T. McClain

[57] ABSTRACT

Protein-containing single-cell microorganisms are texturized by extruding an aqueous cellular paste containing at least some ruptured cells and further conditioning the fibrous extrudate by combination of heating and drying. The texturized product is suitable for use as a food product or as a protein-rich additive for food products.

17 Claims, No Drawings

TEXTURIZING PROCESS FOR SINGLE-CELL PROTEIN

CROSS-REFERENCE TO RELATED APPLICATIONS

This application is a continuation-in-part of application Ser. No. 47,896, filed June 19, 1970 and now abandoned.

BACKGROUND OF THE INVENTION

In recent years much attention has been directed toward the development of new sources of protein which can be incorporated in foods or food additives suitable for human consumption. Rapid increases in world population have made the continued dependence on traditional sources of protein highly impractical. Moreover, the supply of protein from typical sources of protein, such as animal meat and certain vegetables, is inadequate to provide balanced diets sufficient to satisfy the needs of humans throughout the world.

One possible solution to the problem of supplying the ever-increasing need for food protein is provided by processes for the bio-synthetic manufacture of protein through the growth of microorganisms on hydrocarbon or other substrates. It is known, for example, that microorganisms such as bacteria and yeast, which are grown by single-cell reproduction, contain high proportions of proteins and can be utilized directly in foods as whole-cell material or can be treated to recover protein isolate. Recent efforts have shown that microorganisms, grown on hydrocarbon substrates, can be successfully used in animal feeds; but as yet these microorganisms have not been texturization accepted in food preparations suitable for human consumption.

With the development of successful processes for the synthetic production of protein-containing microorganisms (sometimes referred to herein as single-cell proteins), an urgent need has developed for methods of texturizing such single-cell protein materials in a manner sufficient to render them suitable for use in food products. Generally, single-cell protein is initially produced as a wet paste and then is subsequently converted into dry powder form. This dry powder, similar in appearance and feel to flour, lacks the texture and food-like sensation to the mouth necessary to make an attractive food. Moreover, when placed in water, the powdered single-cell protein rapidly reverts back to single-cell form.

Ideally, therefore, it is desirable to impart properties such as chewiness, crispness, resistance to dispersion in water and the like to such single-cell proteins in order that they may be used to full advantage as additives to and substitutes for natural foods. Although various techniques are known in the art for effecting texture formation in soybean based protein, such techniques are not generally applicable to single-cell protein technology and are ineffective in such application. For example, it is known that meat-like protein products can be made from protein-containing soybean meal by subjecting specific mixtures of the meal to heat, pressure and mechanical agitation in an extrusion device. Typically, however, controlled pH texturizing conditions and specific additives, such as sodium hydroxide, are required to cause texturization of the molecular size protein contained in the soybean meal. See, for example, Atkinson U.s. Pat. No. 3,480,442, granted Nov. 25, 1969. In addition, texturization is so easily accomplished that it takes place in the extrusion zone itself rather than in a post treatment zone and, therefore, specific treatment after extrusion is typically unnecessary.

The living world is divided into three "kingdoms"— plant, animal and protist. The first two are multicellular and their development always involves extensive tissue differentiation. Protists are generally unicellular and lack tissue differentiation. Typical protists include yeasts and bacteria. Stated differently, protists represent the simplest level of biological organization while even the lower plants and animals represent vastly more complex biological organizations.

Unicellular protists such as yeasts and bacteria are extremely minute and contain desirable protein enclosed within a cell-wall structure comprising essentially carbohydrate materials. The amino acids comprising the protein of unicellular protists are substantially those involved in the larger protein-containing aggregates of plant or animal origin so that little difference in nutritional value is found.

The cell-wall structure may be viewed as a tough, large bag fashioned from highly cross-linked polysaccharides. Consequently the protein moiety of each cell is shielded from that of every other cell. Hence, the inter-molecular bonding forces which are thought to readily effect texturization of protein found within multi-cellular plant or animal structures cannot be utilized unless some means be found for freeing some portion of protein from within the cell structure. This distinctive structure of unicellular protists has heretofore severly limited the utility of yeasts and bacteria in food products because of inability to effect a suitable and stable degree of texturization.

One explanation for the relative ease of texture formation in soybean meal as compared to the difficulty experienced in texturizing single-cell protein is that soybean-based materials contain molecular size protein particles which are readily texturized while single-cell proteins contain extremely small individual cells in the 1 to 10 micron diameter range. By necessity, therefore, the problem of texturizing single-cell protein is not solved by merely applying known soybean texturization techniques, but rather significantly new process steps are required to effect texture formation in single-cell protein.

SUMMARY OF THE INVENTION

This invention relates generally to the development of texture in protein-containing single-cell microorganism products. This is generally accomplished by extruding an aqueous paste having the requisite pH and comprising both individual whole cells and broken cells whose protein content has not been degraded in molecular weight. The extruded fibers or sheets of the pasty cell material are conditioned to develop texture by employing both heating and drying steps.

The paste should contain only sufficient water to provide a smooth flowing mixture. Heat may be applied during extrusion, but may also be applied after extrusion but before drying, or after extrusion and drying. The intensity of the heat treatment conditioning step need not be severe and can be satisfied by heating for a few minutes at about 180°F. or by heating for only a few seconds at temperatures as high as about 300°F. Over-treatment should be avoided, whether in the form of too long a heating period or too high a heating temperature, or both, because the microbial cellular material can develop a burnt taste.

The texturized products of this invention have highly desirable properties. In contrast to the powdery, nonfibrous character of the original single-cell protein, the products are crisp, crunchy, chewy, have a bland or pleasing flavor and resist dispersion in water. The resistance to dispersion in water is especially important as an indication that a permanent texturization has been successfully effected.

The process of this invention makes possible the production of single-cell protein products having the properties sought in an additive to or substitute for natural foods. The texturized product of this invention is especially useful as an ingredient in wet applications such as sausage and hamburger mixes. The texturization of this invention is accomplished in a controlled manner with simple equipment, no chemical treatment, and no need for addition of extraneous reagents except as required for pH control.

DESCRIPTION OF THE INVENTION

This invention relates to a process for developing texture in microbial single-cell protein-containing substances and to the texturized products so obtained. A desirable texture is difficult to achieve and to maintain when working with such cells due in part to their very small size. To achieve acceptability as a food product or food additive, in terms of chewiness, crunchiness and especially resistance to dispersion in water, the small cells must be made to adhere to each other with a significant degree of permanency. This must be accomplished without sacrificing other desirable properties such as flavor. The need, therefore, is for a texturizing process that is efficient, straightforward in its application, and sufficiently mild that flavor is not impaired.

The texturizing process of this invention involves treating microbial single-cell material, including at least some ruptured cells, in the form of a flowable aqueous paste by extrusion to form a fibrous filament or sheet which is further conditioned by heating at an elevated temperature for a relatively short period of time. If desired, the paste may be formed solely from ruptured cell material. The dried protein product possesses the texture requisite to impart the desirable qualities sought in food products, additives for inclusion in existing food products, and new or substitute food products.

The microbial cells employed in this invention have diameters in the range from 1 to 10 microns and comprise a tough proteinaceous cell wall structure enclosing an aqueous complex of protoplasmic protein components together with nucleic acids. As a consequence of rupturing the cell wall this colloidal fluid is no longer confined and can thereafter be distributed more or less uniformly in a paste mixture containing a major portion of whole cells together with the cell wall fragments of the ruptured cells. Effectiveness of the colloidal fluid is maximized by the avoidance of cell rupture techniques which cause a degradation in the molecular weight of the protein components.

One theory for the texturization achieved by the process of this invention suggests that the colloidal fluid, being well dispersed between the outer walls of the whole cells and the wall fragments of the ruptured cells, effects a cross-linking of the cells and cell particles under the influence of heat and moisture. The cells are densely packed and imbedded in a matrix of broken cell material having sufficient body so that subsequent removal of moisture does not cause formation of large voids that weaken the structure. Whatever the mechanism of the texturization process may be, a suitable product is obtained only when the conditioning, or curing, operation includes a heating step. The conditioning process also includes a drying step dependent upon the amount of water in the initial cell paste and the desired moisture content of the texturized product.

Any living microbial cell material can be treated according to the texturization process of this invention. In a fully integrated, continuous system, the microbial cells are conveniently grown in a fermentation stage where oxygen and a suitable substrate such as a liquid or gaseous hydrocarbon, an alcohol or a carbohydrate together with a nutrient solution containing vitamins and minerals are fed to a stirred reactor containing the microorganisms. The growth rate of microorganisms on the hydrocarbon or other substrate is typically exponential in nature. As the microorganism concentration increases, a portion of the fermentation broth is withdrawn from the stirred reactor and the cellular microorganisms separated therefrom.

By way of illustration, bacteria such as those listed in Table I and yeasts such as those listed in Table II are suitable microorganisms for use as starting materials in the practice of this invention.

TABLE I — Suitable Bacteria

*Acetobacter sp.*
*Arthrobacter sp.*
*Bacillus subtilus*
*Corynebacteria sp.*
*Micrococcus sp.*
*Pseudomonas sp.*

TABLE II — Suitable Yeasts

*Candida curvata*
Candida lipolytica
Candida pulcherima
Candida utilis
Hansenula anomala
Oidium lactis
Saccharomyces carlsbergensis
Saccharomyces cerevisiae
Saccharomyces fragilis
Trichosporon cutaneum The use of *Candida utilis, Saccharomyces cerevisiae, Saccharomyces fragilis,* or *Saccharomyces carlsbergensis* is preferred for the texturization process of this invention, however, because each has F.D.A. approval for use in food products.

This invention generally involves mixing whole cells with an aqueous suspension of ruptured cells to form a uniform flowable paste. The paste is then extruded through fine die orifices or slits to convert the cell mixture to a mass of fibrous filaments or sheets. The cell mixture is texturized by curing while in the filament or sheet form, the course of the conditioning step being dependent upon the temperature employed both during extrusion and subsequent thereto.

The cell paste is generally prepared by mixing together uniformly individual whole cells and cells whose walls have been ruptured in such proportion that, on a dry weight basis, the proportion of whole cell material to ruptured cell material is in the range from about 2 to about 98 percent. This process is also effective when only ruptured cell material is employed. The whole cells may have been recovered as a washed harvest from a fermentation broth as by centrifugation and vacuum filtration to remove most of the water present, or may have been dried as for example by spray-drying or drum-drying. Cell rupture may be effected by either physical or enzymatic methods. Physical rupture may be effected with an aqueous cell slurry, containing from about 5 to about 40 wt. % cells, by expressing the slurry at a pressure in the range from 3,000 to 10,000 p.s.i. employing conventional pressing apparatus, for example, a French press. It has been observed that yeast cell walls become tougher as they age and accordingly a preferred operation would employ freshly harvested cells in a pressing step. Enzymatic rupture of cell walls is effected by lysing in the presence of a suitable enzyme such as Pronase or Carboxy peptidase in an aqueous medium at a temperature in the range from about 25° to about 35°C. In this latter case the cell wall may not be completely ruptured but may have been dissolved to the extent that the contained colloidal fluids can escape by permeation. In any event the rupturing process, whether physical or enzymatic, should provide an aqueous slurry in which at least about 25 percent, and preferably about 50 percent, of the cells present have leaked at least part of their colloidal protoplasmic content into the aqueous phase. The selected combination of whole and broken cells is then brought to a pH in the range from about 5.0 to about 7.5 and blended into a uniform flowable paste. The degree of flowability is a function of the water content of the paste. A suitable paste can be obtained by maintaining the water content suitably within the range from about 15 to 40 wt. %, desirably from about 20 to about 35 wt. %, and preferably about 25 wt. %.

The flowable paste of single-cell material is extruded through a die having an orifice or slit, preferably an orifice whose diameter is in the range from 0.001 to 0.10 inch. The extruder may be heated so that an elevated extrusion temperature may be achieved. In general the extrusion may be effected at a pressure in the range from about 50 to about 1,000 p.s.i. or more and at a temperature in the range from about 70° to about 350°F. Although heating during extrusion is not required in this invention, some application of heat may be desirable to provide the proper plasticity in the paste mixture for ready extrusion into fibrous filaments. Heating during extrusion should be carefully limited to avoid development of an off-flavor (burnt taste).

An essential part of the conditioning process is the heating step. The time and intensity of the heating period are interrelated, the longer heating periods being employed with the lower heating zone temperatures. At the highest temeratures employed conditioning may be effected in a matter of a few seconds or, at most a minute or so (about 0.1–1.0 minutes). In instances where the extrusion is effected at high temperature, e.g., above about 200°F., no further heating may be required in the conditioning step to effect the desired degree of texturization. On the other hand where extrusion is effected at ambient temperature, for example, 70° to 125°F., a heating period is required which may range from about 10 to 30 minutes at a temperature of about 180°F. to about 1 to 5 minutes at about 250°F. and less than about 1 minute at about 300°F.

Another necessary part of the conditioning process is the drying step. Where the fibers have been heated sufficiently during their formation in the extrusion step, e.g., leaving the die at a temperature above about 200°F. to effect texturization, the filaments may be dried quickly in a stream of air at ambient temperature as they are carried away from the die. This also serves to cool the product and limit the total time of exposure to an elevated temperature. When the extrusion has been preferably effected at a relatively low temperature, e.g., below about 125°F., the drying step may either precede or follow the heat conditioning step. When the drying step precedes the heat conditioning, a stream of warm air is preferred but drying of a heated, texturized fiber can be effected in streaming air at ambient temperature. When low-temperature extrusion is employed, a drying step is desirable prior to heating in a steam atmosphere (autoclave). This is not required when dry heat (oven) is to be employed. An oven-heated product requires no final drying step although a final drying operation is usually preferred where autoclave heating has been employed. When drying a heated filament the carrier gas serves also to impart improved strength and appearance to the product.

The extent of drying should be controlled to yield the desired moisture content in the final texturized product. Generally, the moisture content will be in the range from about 2 to about 10 wt. %. No storage problems have been encountered when the moisture content of the product is in a preferred range from about 2 to about 6 wt. %.

The process of this invention imparts a permanent texturization to single-cell protein materials with a minimum application of heat and no chemical treatment other than pH control. This minimum of required processing is particularly important in preserving desirable qualities of odor, taste and color while effectively adding the necessary texture qualities reflected in the chewy and crunchy nature of the product.

The process of this invention also provides a ready control of the relative proportions of whole cells and broken-cell components. These proportions may be varied over a wide range as desired or required to achieve the requisite properties in the texturized product from the various single-cell micoorganisms. Indeed, suitable texturization can be effected employing only broken-cell material in this process. Cellular materials from separate fermentations may be blended together, for example, employing whole cells of one microorganism and broken-cell material derived from a second microorganism, or employing broken-cell material from two microorganisms. If desired, the rupture process may be controlled to provide the requisite proportions of whole and ruptured cells so that paste formation will require only a minimum of de-watering prior to extrusion. Alternatively, the rupture operation may be intensified to provide a high proportion of broken cells wherein at least a portion of the colloidal protoplasmic material is separately processed to yield a protein isolate. One suitable procedure involves isolating from about 10 to about 20 percent of the cell paste concentrate, slurrying and rupturing the cell walls of at least part of the cells contained in the separated portion of the concentrate, and recombining with the remainder of the original cell paste concentrate for texturization processing.

The flexibility of the process of this invention provides ready access to a variety of nutritious and acceptable food products to augment available food resources.

EXAMPLES

The following examples are illustrative, without limitation, of the process and product of this invention.

EXAMPLE I

Moist Torula yeast (*Candida utilis*) paste containing 20 wt. % water was extruded as a fiber at 212°F. Additional water was required to provide a flowable yeast paste at room temperature. A stronger fiber was obtained when using an air stream as carrier gas for the extrudate. The strongest fiber was obtained when the paste was extruded at 212°F. with a carrier gas. The fibers had a yeasty flavor and were not stable to moisture.

EXAMPLE II

The Torula yeast extrudates of Example I were heated at about 300°F. for one minute. Fiber strength was much improved but the products slowly dispersed in water. In all instances the texturised fibers had acquired a burnt flavor that was not acceptable.

EXAMPLE III

Spray-dried Torula yeast, containing 4 wt. % water, was mixed with 25 wt. % distilled water and worked into a paste. In separate preparations minor amounts of sodium hydroxide (sufficient to raise the pH from 5.7 to 6.4), disodium phosphate and sodium lauryl sulfate were incorporated into the added water. Each blended paste was then heated to 212°F. and forced through a die into an air stream. Each extrudate was a strong flexible fiber, but dispersed slowly when placed in water. When heated at about 300°F. in an oven, in hot oil, in an autoclave, or by microwaves, there was generally an improvement in resistance to dispersion in water but, in all cases, there was developed a pronounced burnt flavor.

EXAMPLE IV

Spray-dried Torula yeast was mixed with 25 wt. % distilled water as in Example III except that 15 percent of the yeast was replaced by material from broken yeast cells. The blended paste was extruded at 212°F. and the filaments heated in an autoclave at 250°F. The conditioned fibers possessed a pleasant, brittle texture, an acceptable flavor, and did not disperse when placed in water.

EXAMPLE V

Twenty weight parts of drum-dried Torula yeast was mixed with 11.7 weight parts of cell suspension (78 wt. % water) that had been expressed four times through a French press at 4,500 p.s.i. About 50 percent of the yeast cells in the suspension were partially broken. The pH of the cell suspension was 5.7. This was adjusted to 6.4 by addition of aqueous sodium hydroxide. After mixing the blended paste contained 29 wt. % moisture.

EXAMPLE VI

The yeast paste of Example V was extruded into a fiber at 212°F. employing an air stream as carrier gas. The fibers were further heated for 15 minutes in an autoclave at 250°F. and then cooled. The conditioned fibers were stable in water and had developed no burnt flavor.

EXAMPLE VII

The yeast paste of Example V was extruded into a fiber at ambient temperature (about 80°F). One portion of the fiber was heated at 250°F. in a steam autoclave for 15 minutes and then dried in a stream of air. A second portion of the fiber was dried in a stream of air at ambient temperature, autoclaved at 250°F. for 15 minutes, and finally cooled. Each portion of fiber possessed a crisp, crunchy texture and no burnt flavor had developed. Each portion of fiber was stable to dispersion in water.

I claim:

1. A process for developing texture in microbial cells comprising the steps of:
   a. preparing an aqueous paste of microbial cell material, containing from about 15 to about 40 wt. % water and at least about 2 wt. % (dry basis) ruptured cells;
   b. extruding the paste at a temperature within the range from about 70° to about 350°F.;
   c. heat-treating the extrudate at a temperature within the range from about 180°F. to about 350°F. for a period of time inversely related to the temperature employed and within the range from about 0.1 to about 30 minutes; and
   d. drying the heat-treated extrudate to produce a product which is crisp, crunchy, chewy, has a bland or pleasing flavor and resists dispersion in water.

2. The process of claim 1 wherein the pH of the aqueous paste is within the range from about 5.0 to about 7.5.

3. The process of claim 1 wherein the paste is extruded at a temperature within the range from 70° to 125°F. and the extrudate is subsequently heated at a temperature within the range from 180° to 300°F. for from about 1 to about 30 minutes.

4. The process of claim 3 wherein the extrudate is dried in an air stream prior to the heating step.

5. The process of claim 1 wherein the paste is extruded at a temperature within the range from 200° to 300°F. and the extrudate is subsequently dried in a stream of air.

6. The process of claim 1 wherein the microbial cells are selected from the group consisting of *Candida utilis*, *Saccharomyces cervisiae*, *Saccharomyces fragilis*, and *Saccharomyces carlsbergensis*.

7. A process for developing texture in microbial single-cell protein products wherein an aqueous paste of mixed whole and broken microbial cells is provided, comprising the steps of:
   a. mixing together individual whole microbial cells and an aqueous slurry of broken microbial cells to yield a paste containing 20–35 wt. % water, the remainder comprising microbial cell product wherein the ratio of whole cells to broken cells is in the proportion from about 2 to about 98 percent;
   b. extruding the paste at ambient temperature;
   c. heating the extrudate at a temperature in the range from about 180° to about 300°F. for a period of time inversely related to the temperature employed and within the range from less than 1 minute up to about 30 minutes; and d. drying the extrudate to produce a product which is crisp, crunchy, chewy, has a bland or pleasing flavor and resists dispersion in water.

8. The process of claim 7 wherein the extrudate is dried in a stream of air prior to heating.

9. The process of claim 7 wherein the extrudate is heated at about 180°F. for from about 10 to about 30 minutes prior to the drying step.

10. The process of claim 7 wherein the extrudate is heated at about 250°F. for from about 1 to about 5 minutes prior to the drying step.

11. The process of claim 7 wherein the extrudate is heated at about 300°F. for less than 1 minute prior to the drying step.

12. The process of claim 7 wherein the microbial cells are selected from the group consisting of *Candida utilis, Saccharomyces cerevisiae, Saccharomyces fragilis,* and *Saccharomyces carlsbergensis*.

13. A process for imparting texture to protein-containing microbial cells, comprising the steps of:
    a. isolating a harvest of washed microbial cells to provide a concentrate containing no more than 25 wt. % water;
    b. separating the microbial cell concentrate into two portions, the first portion containing from about 10 to about 20 percent of the total concentrate;
    c. slurrying the first portion of cell concentrate with sufficient water to provide a slurry containing from about 5 to about 40 wt. % cells;
    d. expressing the slurry in a pressing apparatus employing a pressure in the range from 3,000 to 10,000 pounds/square inch, to provide an expressed slurry in which the cell walls of at least about 25 percent of the microbial cells have been ruptured;
    e. combining the expressed slurry with the second portion of cell concentrate to provide a microbial cell paste comprising both whole cells and ruptured cells;
    f. extruding the paste through a die, whose opening has a diameter in the range from 0.001 to 0.10 inch, maintained at a temperature in the range from 70° to 350°F.;
    g. heating the extrudate at a temperature within the range from about 180° to about 350°F. for a period of time inversely related to the temperature employed and within the range from about 0.1 to about 30 minutes; and
    h. drying the extrudate to produce a product which is crisp, crunchy, chewy, has a bland or pleasing flavor and resists dispersion in water.

14. The process of claim 13 wherein the microbial cells are selected from the group consisting of *Candida utilis, Saccharomyces cerevisiae, Saccharomyces fragilis,* and *Saccharomyces carlsbergensis*.

15. The process of claim 13 wherein the paste is extruded at a temperature in the range from about 70° to about 125°F. and the extrudate is thereafter dried in a stream of air and subsequently heated in the presence of steam at a temperature in the range from about 180° to about 300°F. for a time period ranging from about 1 to about 30 minutes.

16. The process of claim 13 wherein the paste is extruded at a temperature in the range from about 200° to about 350°F. and the extrudate is thereafter dried and cooled in a stream of air at ambient temperature.

17. The texturized microbial cell product prepared by the process of claim 1 having a moisture content within the range from about 2 to about 10 wt. %.

* * * * *

UNITED STATES PATENT OFFICE
CERTIFICATE OF CORRECTION

Patent No. 3,843,807          Dated October 22, 1974

Inventor(s) John A. Ridgway, Jr.

It is certified that error appears in the above-identified patent and that said Letters Patent are hereby corrected as shown below:

Column 1, line 33, "texturization" should be -- commercially --.

Column 2,
      lines 31-32, "severly" should be -- severely --.

Signed and sealed this 11th day of March 1975.

(SEAL)
Attest:

RUTH C. MASON
Attesting Officer

C. MARSHALL DANN
Commissioner of Patents
and Trademarks